(12) United States Patent
Tange et al.

(10) Patent No.: US 8,308,150 B2
(45) Date of Patent: Nov. 13, 2012

(54) COIL SPRING FOR VEHICLE SUSPENSION AND METHOD FOR MANUFACTURING THE SAME

(75) Inventors: Akira Tange, Yokohama (JP); Hideki Okada, Yokohama (JP); Isao Sumiyoshi, Yokohama (JP); Mitsuhiro Sugiyama, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 0 days.

(21) Appl. No.: 12/732,450

(22) Filed: Mar. 26, 2010

(65) Prior Publication Data
US 2010/0320662 A1 Dec. 23, 2010

(30) Foreign Application Priority Data
Jun. 17, 2009 (JP) ................. 2009-144460

(51) Int. Cl.
 *B60G 11/14* (2006.01)
 *C21D 7/06* (2006.01)
(52) U.S. Cl. .............. 267/286; 267/166; 29/90.7; 72/53
(58) Field of Classification Search .................. 267/166, 267/167, 169, 248, 286, 155; 72/53, 54, 72/55, 66; 29/90.7; 148/580
 See application file for complete search history.

(56) References Cited

U.S. PATENT DOCUMENTS

| | | | |
|---|---|---|---|
| 5,225,008 A | 7/1993 | Koyama et al. | |
| 5,258,082 A | 11/1993 | Koyama et al. | |
| 6,193,816 B1 | 2/2001 | Nakano et al. | |
| 6,544,360 B1 * | 4/2003 | Tange et al. | 148/580 |
| 6,811,149 B1 * | 11/2004 | Johnson | 267/167 |
| 7,284,308 B2 | 10/2007 | Akeda et al. | |
| 2006/0060269 A1 * | 3/2006 | Nakano et al. | 148/580 |
| 2007/0267112 A1 | 11/2007 | Yoshikawa et al. | |

FOREIGN PATENT DOCUMENTS

| | | |
|---|---|---|
| JP | 63-076730 A | 4/1988 |
| JP | 5-140643 A | 6/1993 |
| JP | 5-177544 A | 7/1993 |
| JP | 5-086418 B | 12/1993 |

(Continued)

OTHER PUBLICATIONS

International Search Report (PCT/ISA/210) dated May 18, 2010 in counterpart International Application No. PCT/ JP2010/ 052659.

(Continued)

*Primary Examiner* — Melody Burch
(74) *Attorney, Agent, or Firm* — Holtz, Holtz, Goodman & Chick, PC

(57) ABSTRACT

A spring wire with hardness of 50 to 56 HRC is subjected to first and second shot peening processes within a warm working temperature range of 150 to 350° C. In the first shot peening process, the first shot of a shot size of 1.0 mm or more is used. In the second shot peening process, the second shot smaller in shot size than the first shot is used. Through these shot peening processes, compressive residual stress is imparted to the spring wire. The spring wire includes a residual stress increase part, residual stress peak part, and residual stress decrease part. In the residual stress decrease part, a part including the compressive residual stress magnitude of which is equivalent to the magnitude of the compressive residual stress at the surface of the spring wire exists at a position at a depth exceeding the permissible pit depth.

3 Claims, 7 Drawing Sheets

FOREIGN PATENT DOCUMENTS

| | | |
|---|---|---|
| JP | 11-241143 A | 9/1999 |
| JP | 2000-317838 A | 11/2000 |
| JP | 2000-345238 A | 12/2000 |
| JP | 2001-082518 A | 3/2001 |
| JP | 2004-315944 A | 11/2004 |
| JP | 2004-323912 A | 11/2004 |
| JP | 2005-002365 A | 1/2005 |
| JP | 2008-106365 A | 5/2008 |
| WO | WO 03/055643 A1 | 7/2003 |

OTHER PUBLICATIONS

PCT Form 237 (PCT/ ISA/ 237) dated May 18, 2010.
Japanese Office Action dated Jul. 3, 2012 and English translation thereof in counterpart Japanese Application No. 2009-144460, (Only a 1-page notice is provided).
Japanese Office Action dated Jul. 3, 2012 and English translation thereof in counterpart Japanese Application No. 2009-144460.

* cited by examiner

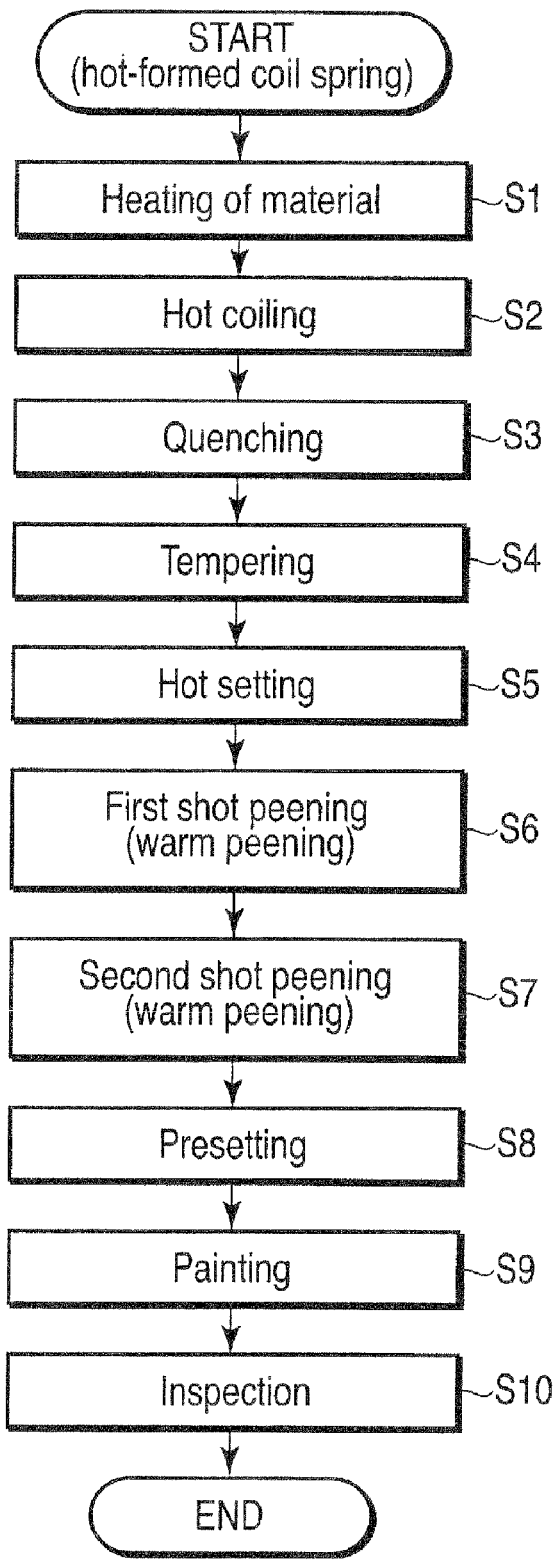
F I G. 3

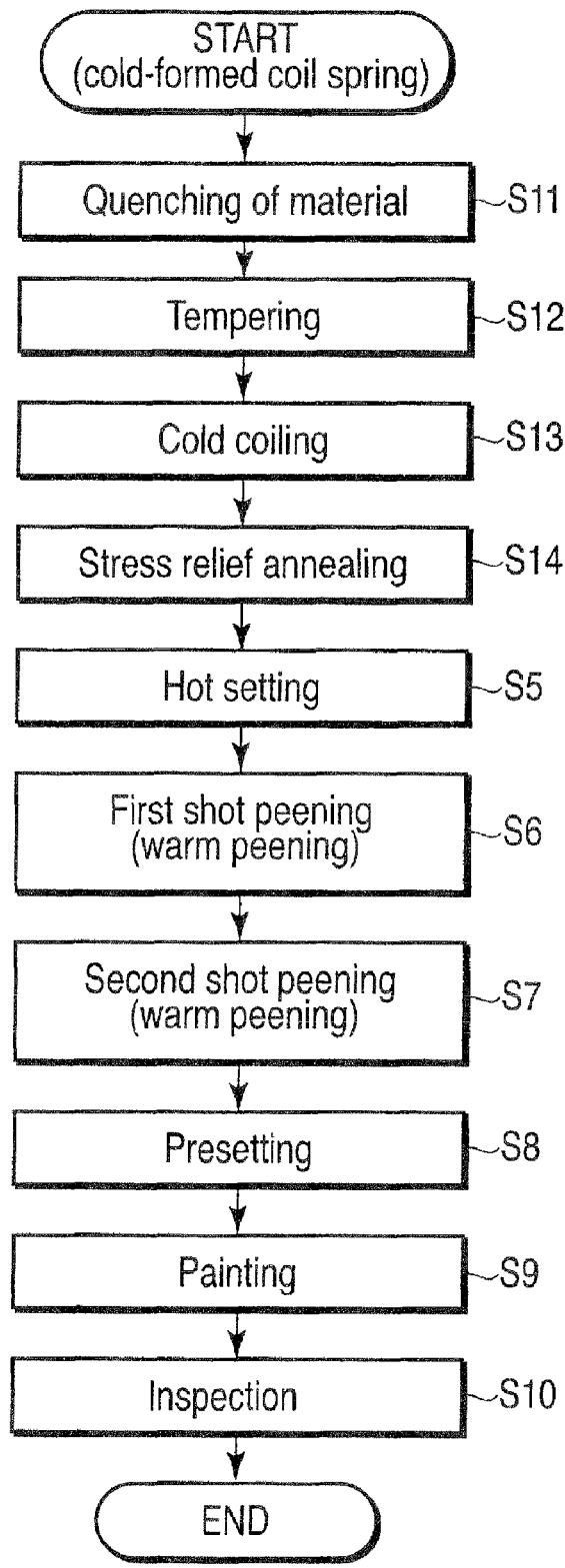
F I G. 4

COIL SPRING FOR VEHICLE SUSPENSION AND METHOD FOR MANUFACTURING THE SAME

CROSS-REFERENCE TO RELATED APPLICATIONS

This application is based upon and claims the benefit of priority from prior Japanese Patent. Application No. 2009-144460, filed Jun. 17, 2009, the entire contents of which are incorporated herein by reference.

BACKGROUND OF THE INVENTION

1. Field of the Invention

The present invention relates to a coil spring for vehicle suspension used for a suspension mechanism of a vehicle such as an automobile or the like, excellent in corrosion durability, and method for manufacturing the same.

2. Description of the Related Art

It is known that a coil spring for suspension mechanism is subject to an influence of an antifreeze agent scattered on a road in the wintertime or the like. The antifreeze agent contains salt, and hence the agent promotes corrosion of the surface of the coil spring constituted of spring steel. It is known that a corrosion pit (etch pit) particularly exerts a great influence upon the durability of the coil spring. For example, as shown in FIG. 11, part of the surface 1a of the spring wire 1 is corroded to form a hole-like shape by moisture or salt, whereby a corrosion pit 2 is formed. Although the shape of the corrosion pit 2 varies, there is even a corrosion pit 2 having a cross section as schematically shown in, for example, FIG. 12.

As shown in FIG. 13, when the corrosion pit 2 reaches a depth R of a certain level or more, and the weight of the vehicle is continuously applied to the coil spring, a fatigue crack 3 occurs at the bottom part 2a or the like of the pit 2. When the crack 3 grows large, the coil spring is broken. In other words, even when the coil spring is used in a corrosive environment, the coil spring can be used without breakage if the size of the corrosion pit is within the permissible pit depth $R_{max}$.

On the other hand, it is desired that the coil spring for suspension be used at higher stress in order to effect weight reduction of a vehicle. In order to realize the higher stress in the coil spring, it becomes important to impart compressive residual stress to the vicinity of the surface of the spring wire. It is known from the past that by subjecting a coil spring to shot peening, compressive residual stress is imparted to the vicinity of the surface of the coil spring, and the durability thereof is enhanced. For example, in Jpn. Pat. Appln. KOKAI Publication No. 2000-345238 or Jpn. Pat. Appln. KOKAI Publication No. 2008-106365, multistage shot peening is disclosed. In the multistage shot peening, shot peening is carried out a plurality of times in a dividing manner.

As means for producing compressive residual stress in a region from the surface of the spring to a deep position, stress peening and warm peening (hot peening) are known. In the stress peening, the shot is applied to the coil spring in a state where the spring is compressed. In the warm peening, the shot is applied to the coil spring in a state where the spring is heated at a temperature of about 250° C. In comparison with the ordinary shot peening to be carried out at room temperature, in the stress peening or warm peening, it is possible to cause compressive residual stress to appear in a region up to a deep position in the material. However, the stress peening requires equipments configured to compress the coil spring. Furthermore, in the stress peening, the shot is applied to the coil spring in a state where the coil spring is compressed, and hence gaps between spring wire parts become small. Accordingly, there is a problem that it is hard for the shot to hit the inside of the coil spring or positions between the spring wire parts.

In a conventional coil spring for suspension, large compressive residual stress is imparted to the vicinity of the surface of the spring by shot peening. However, when the coil spring for suspension is used in a corrosive environment in which a corrosion pit occurs, the coil spring breaks in some cases after a relatively short period of use by the growth of the corrosion pit. Thus, it is also proposed to improve the corrosion resistance, and suppress occurrence of the corrosion pit and growth of the corrosion pit by contriving the components of the material (spring steel).

For example, the corrosion resistance of the coil spring is improved by adding an alloy element such as Ni, Cr, Mo or the like to the spring steel. However, the spring steel containing such an alloy element is expensive, this being a cause making the cost of the coil spring high. Further, once the size of the corrosion pit reaches the permissible pit depth, there is the possibility of the coil spring being broken while making a fatigue crack occurring at a bottom part or the like of the corrosion pit a starting point.

BRIEF SUMMARY OF THE INVENTION

An object of the present invention is to provide a coil spring for vehicle suspension capable of enhancing the corrosion durability, and being used at higher stress, and method for manufacturing the same.

A coil spring for vehicle suspension of the present invention is that made of a spring wire to which compressive residual stress is imparted by shot peening and comprises a residual stress increase part, residual stress peak part, and residual stress decrease part. In the residual stress increase part, the compressive residual stress increases from the surface of the spring wire in a depth direction. In the residual stress peak part, the compressive residual stress becomes the maximum. In the residual stress decrease part, the compressive residual stress decreases from the residual stress peak part in the depth direction of the spring wire. Furthermore, in the coil spring, in the residual stress decrease part, a part comprising the compressive residual stress magnitude of which is equivalent to the magnitude of the compressive residual stress at the surface of the spring wire exists at a position at a depth exceeding the permissible pit depth of the spring wire.

According to the coil spring for vehicle suspension of the present invention, even when the corrosion pit grows to a position near the permissible pit depth, it is possible to prevent a fatigue crack from occurring at the bottom part or the like of the corrosion pit, and enhance the corrosion durability. As a result of this, it becomes possible to use the suspension coil spring for vehicle suspension at higher stress, and effect weight reduction of the vehicle.

When the permissible pit depth of the coil spring is 0.25 mm, it is desirable that compressive residual stress of −400 MPa or more (implying an absolute value of 400 MPa or more, the same is true of the following) be imparted to a region from the surface of the spring wire to a position at the permissible pit depth. As the hardness of the spring wire, the hardness of 50 to 56 HRC is recommendable. Further, it is desirable that a position which is located deeper than the residual stress peak part, and at which the compressive residual stress begins to largely lower be located deeper than 0.2 mm from the surface of the spring. Further, it is also desirable that compressive residual stress of −400 MPa or more be imparted to a region from the surface to a position at a depth of 0.3 mm.

A method for manufacturing a coil spring for vehicle suspension of the present invention comprises a bending process, first shot peening process, and second shot peening process. In the bending process, a spring wire constituted of a spring steel is formed into a helical shape. In the first shot peening process, compressive residual stress is imparted to the spring wire by applying the spring wire with the first shot of a shot size of 1.0 mm or more. The second shot peening process is carried out after the first shot peening process. In the second shot peening process, the spring wire is applied with the second shot smaller in shot size than the first shot. By the first shot peening process, and second shot peening process, a residual stress increase part, residual stress peak part, and residual stress decrease part produced in the spring wire, and in the residual stress decrease part, a part comprising the compressive residual stress magnitude of which is equivalent to the magnitude of the compressive residual stress at the surface of the spring wire is generated at a position at a depth exceeding the permissible pit depth of the spring wire.

According to the manufacturing method of the present invention, it is possible to cause a high level of compressive residual stress effective in preventing occurrence of a fatigue crack and development of the crack to appear in a region from the surface of the spring wire to a position at a depth exceeding the permissible pit depth. Furthermore, it is possible to make a difference between the compressive residual stress near the surface of the spring wire and compressive residual stress near the bottom part of the corrosion pit small. As a result of this, it is possible to obtain compressive residual stress distribution highly effective in preventing a fatigue crack from occurring in the corrosion pit.

In the present invention, it is recommendable to carry out the first shot peening process and second shot peening process in a state where the spring wire is kept at a processing temperature of 150 to 350° C. The processing temperature in the first shot peening process is higher than the processing temperature in the second shot peening process. Further, it is advisable to make the kinetic energy of the first shot greater than the kinetic energy of the second shot.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a flowchart showing an example of manufacturing processes of the coil spring for suspension shown in FIG. 2;

FIG. 4 is a flowchart showing another example of manufacturing processes of the coil spring for suspension shown in FIG. 2;

DETAILED DESCRIPTION OF THE INVENTION

A coil spring for vehicle suspension according to an embodiment of the present invention, and method for manufacturing the coil spring will be described below with reference to the drawings.

Figure 1:
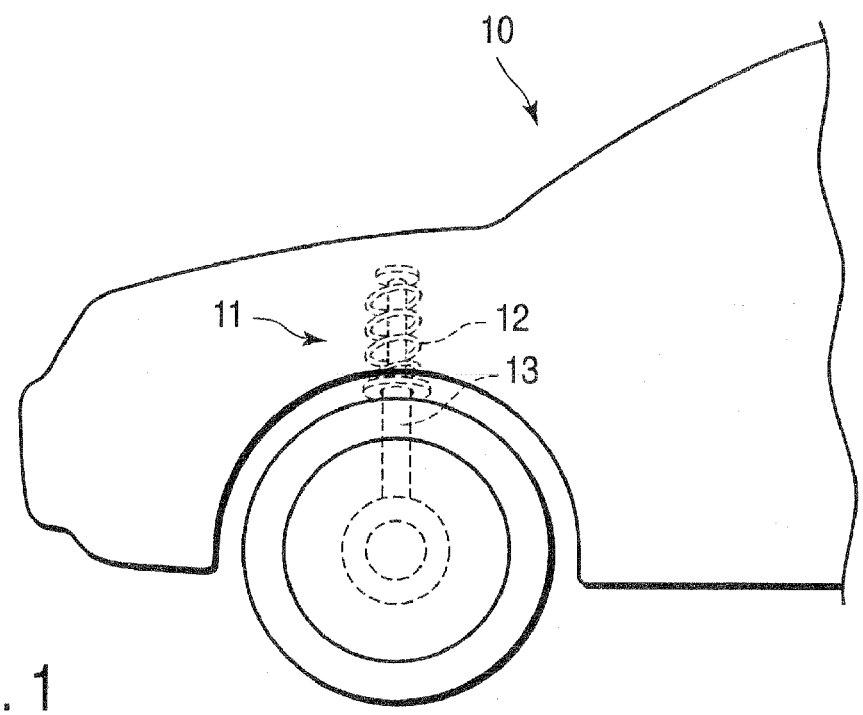
FIG. 1 is a side view of part of an automobile provided with a coil spring for suspension according to an embodiment of the present invention.
Figure 2:
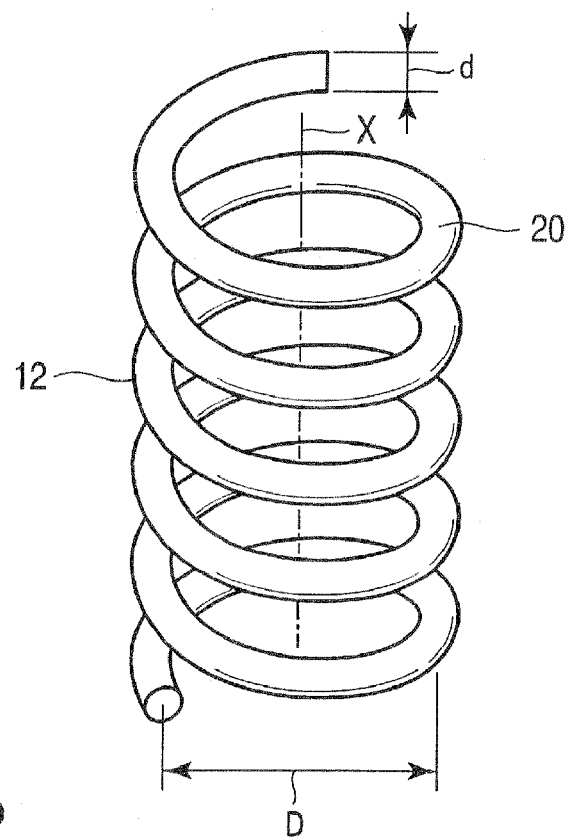
FIG. 2 is a perspective view of a coil spring for suspension shown in FIG. 1.

A suspension mechanism 11 of a vehicle 10 shown in FIG. 1 is provided with a coil spring 12 for vehicle suspension (hereinafter referred to simply as a coil spring 12), and shock absorber 13. In the coil spring 12 shown in FIG. 2, a spring wire 20 is formed into a helical shape. The coil spring 12 elastically supports the load of the vehicle 10 in a state where the spring 12 is compressed in the direction of the axis X.

An example of the coil spring 12 is a cylindrical coil spring. An example of a wire diameter d (shown in FIG. 2) of the spring wire 20 is 12.5 mm. An average coil diameter D is 110.0 mm, free length (length at no load) is 382 mm, number of active turns is 5.39, and spring constant is 33.3 N/mm. Although the main stream of the wire diameter of the coil spring 12 is 8 to 21 mm, diameters other than the above may also be employed. Further, coil springs of various forms such as a barrel-shaped spring, double headed conical spring, tapered coil spring, variable pitch coil spring, load axis control coil spring, and the like may also be employed.

EXAMPLE 1

The type of steel of the spring wire 20 is high corrosion resistant spring steel (in this description, referred to as spring steel S for convenience). The spring steel S is of a steel type enhanced in corrosion resistance, and the chemical components (mass %) thereof are C: 0.41, Si: 1.73, Mn: 0.17, Ni: 0.53, Cr: 1.05, V: 0.163, Ti: 0.056, Cu: 0.21, and Fe: remnant.

FIG. 3 shows manufacturing processes of a hot-formed coil spring. In a heating process S1, a spring wire which is a material for the coil spring is heated at an austenitizing temperature (higher than $A_3$ transformation point, and lower than 1150° C.). The heated spring wire is bent into a helical shape in a bending process (coiling process) S2. Thereafter, the coiled spring wire is subjected to heat treatment such as a quenching process S3, tempering process S4, and the like.

The spring wire is thermal refined by the heat treatment so that the hardness of 50 to 56 HRC can be obtained. For example, a coil spring of design maximum stress of 1300 MPa is thermal refined so that hardness of 54.5 HRC can be obtained. A coil spring of design thermal refined so that hardness of 53.5 HRC can be obtained. Further, in a hot setting process S5, a load in the axial direction of the coil spring is applied to the coil spring for a predetermined time. The hot setting process S5 is carried out as warm working by utilizing the remaining heat after the heat treatment.

Thereafter, a first shot peening process S6 is carried out. In the first shot peening process S6, the first shot (cut wire pieces made of iron) having a shot size (grain size) of 1.0 mm is used. The spring wire is applied with the first shot at a processing temperature of 230° C., at a velocity of 76.7 m/s, and with kinetic energy of $12.11 \times 10^{-3}$ J. As a result of this, compressive residual stress appears in a wide region from the surface of the spring wire in the depth direction. The compressive residual stress distribution will be described later in detail. It is desirable that the surface roughness of the spring wire obtained by the first shot peening process S6 be 75 µm or less. It should be noted that the velocity of the shot is a value obtained by multiplying the circumferential velocity obtained from the diameter of the impeller of the shot peening machine, and rotational speed of the impeller by 1.3. For example, when the diameter of the impeller is 490 mm, and rotational speed of the impeller is 2300 rpm, the velocity of the shot becomes $1.3 \times 0.49 \times 3.14 \times 2300/60 = 76.7$ m/s.

After the first shot peening process S6 is carried out, a second shot peening process S7 is carried out. In the second shot peening process S7, the second shot smaller in size than the first shot is used. The shot size of the second shot is 0.67 mm. The spring wire is applied with the second shot at a processing temperature of 200° C., at a velocity of 46 m/s, and with kinetic energy of $1.31 \times 10^{-3}$ J.

In the second shot peening process S7, the second shot smaller in size than that of the first shot in the first shot peening 56 is used. Furthermore, the velocity of the second shot in the second shot peening process S7 is smaller than the velocity of the first shot in the first shot peening process S6. As a result of this, the large surface roughness of the spring wire after the first shot peening process S6 can be made small by the second shot peening process S7, and the surface state of the spring wire is improved. It should be noted that as another example of the second shot peening process S7, the spring wire may be applied with the second shot having a shot size of 0.40 mm at a processing temperature of 200° C., at a velocity of 86.7 m/s, and with kinetic energy of $0.99 \times 10^{-3}$ J.

Table 1 shows data in which kinetic energy values of the shots are compared with each other in terms of shot peening conditions. When the shot size is larger, the kinetic energy becomes larger even if the same velocity is employed. For example, when the large-grain shot having a shot size of 1 mm is used, the kinetic energy becomes about 1.5 times that of the shot having a shot size of 0.87 mm. When the large-grain shot having a shot size of 1.1 mm is used, the kinetic energy becomes about twice that of the shot having the shot size of 0.87 mm. Conversely, when the small-grain shot having a shot size of 0.67 mm is used, the kinetic energy becomes less than half that of the shot having the shot size of 0.87 mm. When the shot having a shot size of 0.4 mm is used, the kinetic energy becomes less than that of the shot having the shot size of 0.67 mm even if the velocity is made about twice.

In each of all the cases including example 1, and examples 2 to 5 to be described later, the kinetic energy of the first shot of the first shot peening process S6 is made greater than the kinetic energy of the second shot of the second shot peening process S7.

TABLE 1

| Shot size (mm) | Impeller rotational speed (rpm) | Velocity (m/s) | Kinetic energy (J) | Ratio of energy |
|---|---|---|---|---|
| 1.10 | 2300 | 76.7 | 0.01612 | 2.02 |
| 1.00 | 2300 | 76.7 | 0.01211 | 1.52 |
| 0.87 | 2300 | 76.7 | 0.00797 | 1.00 |
| 0.67 | 2300 | 76.7 | 0.00364 | 0.46 |
| 0.67 | 1380 | 46.0 | 0.00131 | 0.16 |
| 0.40 | 2600 | 86.7 | 0.00099 | 0.12 |

As the processing temperature in each of the first shot peening process 56 and second shot peening process S7, a temperature within a range of 150 to 350° C. is suitable. That is, these processes are warm peening (hot peening) processes utilizing the remaining heat after the heat treatment. Furthermore, the second shot peening process 67 is carried out at a processing temperature lower than the first shot peening process S6.

According to the shot peening processes S6 and S7 of example 1, it is possible to produce large compressive residual stress from the surface to the deep position without compressing the coil spring unlike in the conventional stress peening. As a result of this, equipments configured to compress the coil spring are made unnecessary unlike in the case of stress peening. Furthermore, intervals between the spring wire parts are not narrowed unlike in the stress peening, and hence it is possible for the shot to sufficiently hit the inside of the coil spring or positions between spring wire parts.

After the two stages of the shot peening processes S6 and S7 have been carried out, a presetting process S8 and painting process S9 are carried out. Thereafter, in order to inspect the external appearance and characteristics of the coil spring, an inspection process S10 is conducted. It should be noted that the presetting process S8 may be omitted.

FIG. 4 shows a manufacturing process of a case where the coil spring is coiled in the cold working. As shown in FIG. 4, the spring wire before being subjected to the coiling process is subjected in advance to heat treatment such as a quenching process S11, tempering process 512, and the like. The spring wire is formed into a helical shape in a bending process (coiling process) S13 to be carried out as cold working. Thereafter, in a stress relief annealing process S14, the coil spring is left as it is in an atmosphere of a predetermined temperature for a predetermined time, whereby the processing strain caused during the formation time is eliminated.

Thereafter, in this manufacturing process shown in FIG. 4 as in the case of the hot-formed coil spring of FIG. 3, the hot setting process S5, first shot peening process S6, second shot peening process S7, presetting process S8, painting process S9, and inspection process S10 are carried out. It should be noted that the coil spring may also be coiled in the warm working. It should be noted that the presetting process S8 may be omitted.

Figure 5:
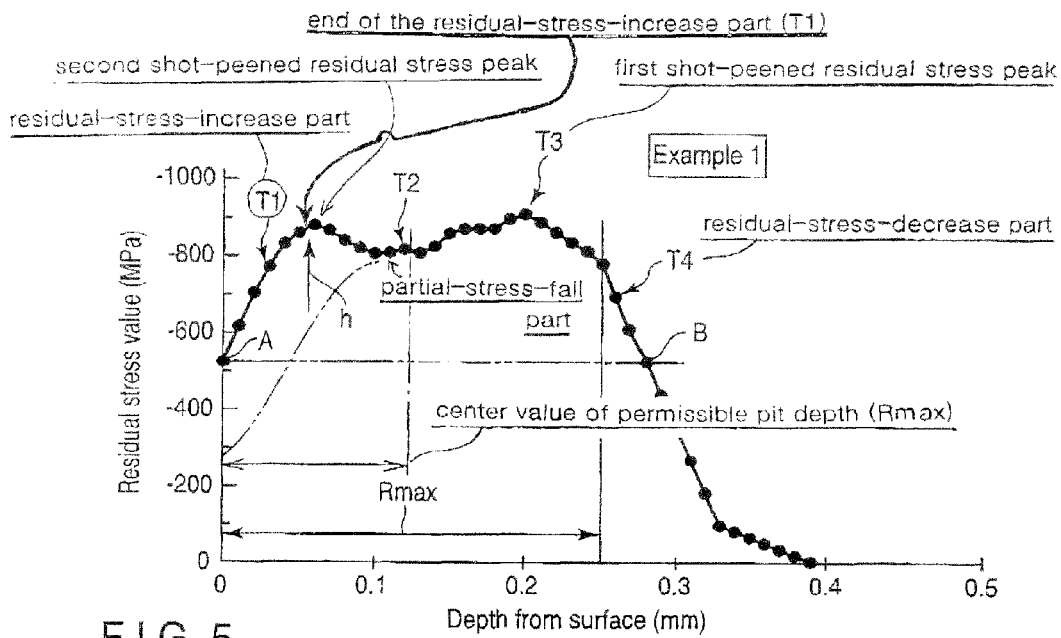
FIG. 5 is a graph showing the compressive residual stress distribution of example 1 according to the present invention.

FIG. 5 shows the compressive residual stress distribution of the coil spring of example 1. The abscissa of FIG. 5 represents positions from the surface of the spring wire in the depth direction. Although the ordinate of FIG. 5 represents the residual stress, in accordance with the customs of the technical field, the compressive residual stress values are expressed as negative values.

As shown in FIG. 5, the compressive residual stress of the coil spring of example 1 includes a residual stress increase part 11, high stress part 12, residual stress peak part T3, and residual stress decrease part 14. In the residual stress increase part T1, the compressive residual stress increases from the surface of the spring wire toward the inside of the spring wire in the depth direction. In the high stress part T2, the compressive residual stress is maintained at a high level. In the residual stress peak part T3, the compressive residual stress becomes the maximum. In the residual stress decrease part T4, the compressive residual stress decreases from the residual stress peak part T3 in the depth direction of the spring wire. Furthermore, in the coil spring of this example 1, in the residual stress decrease part T4, a part B having the compressive residual stress magnitude of which is equivalent to the magnitude of the compressive residual stress value A at the surface of the spring wire exists at a position at a depth exceeding the permissible pit depth $R_{max}$ of the spring wire.

Here, the permissible pit depth $R_{max}$ implies the maximum pit depth associated with the possibility of the coil spring for suspension having the compressive residual stress distribution obtained by the conventional shot peening being broken while making a fatigue crack occurring at a bottom part or the like of the corrosion pit a starting point. In the conventional coil spring, when the corrosion pit depth gets close to 0.2 to 0.25 mm, the coil spring is broken with a high probability. The permissible pit depth in this case is 0.25 mm.

As shown in FIG. 5, in the coil spring of example 1, the part B having the compressive residual stress magnitude of which is equivalent to the magnitude of the compressive residual stress value A at the surface of the spring wire exists at a position at a depth exceeding the permissible pit depth $R_{max}$ of the spring wire. Furthermore, the coil spring of example 1 has compressive residual stress of −400 MPa or more in a wide region from the surface to a position at a depth exceeding the permissible pit depth $R_{max}$.

In each of all the cases including example 1, and examples 2 to 5 to be described later, two-stage shot peening (warm double shot peening) constituted of the first shot peening process S6 and second shot peening process 37 is carried out. That is, by the first shot peening process S6 of the first stage, the peak of the compressive residual stress appears at a position deep from the surface and, moreover the compressive residual stress occurs up to the deep position. Further, by the second shot peening process S7 of the second stage, it is possible to enhance the compressive residual stress near the surface as indicated by the arrow h in FIG. 5. In this way, it is possible to obtain the high stress part T2 in which the compressive residual stress is maintained at a high level in a region from the vicinity of the surface to a deep position.

It should be noted that when the spring wire is heated in the atmosphere, the surface thereof is decarbonized, and the hardness of the surface is made lower than the inside by about 125 HV. The strength of the compressive residual stress is proportional to the spring hardness. That is, as the spring hardness becomes smaller, the compressive residual stress also becomes smaller. When the spring hardness is 515 HV which is the lower limit of the hardness range of 50 to 56 HRC (515 to 615 HV), and the minimum hardness of the surface at which decarbonization has been caused is 390 HV, the compressive residual stress value of the surface at that time is set at about −400 MPa or more.

EXAMPLE 2

The type of steel of the spring wire is the high corrosion resistant spring steel (spring steel S) identical with example 1. The manufacturing processes are identical with example 1 except for the size of the shot used in a first shot peening process S6. In this example 2, the first shot of a shot size of 1.1 mm was used in the first shot peening process S6. After the first shot peening process S6, a second shot peening process S was carried out by using the second shot having a shot size of 0.67 mm. The velocity of the shot and processing temperature were identical with example 1.

Figure 6:
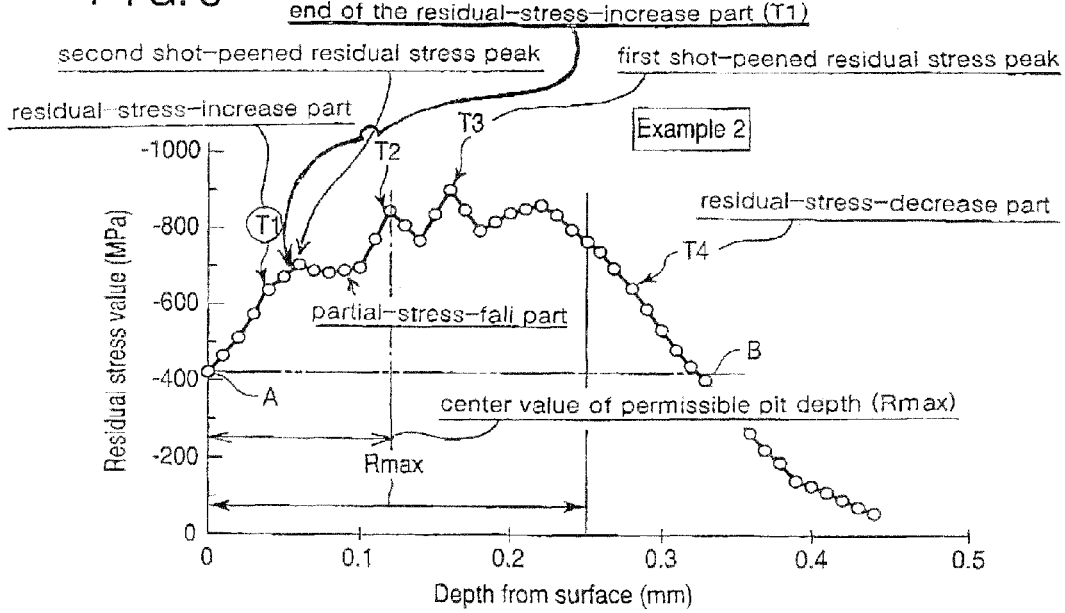
FIG. 6 is a graph showing the compressive residual stress distribution of example 2 according to the present invention.

FIG. 6 shows the compressive residual stress distribution of example 2. The coil spring of example 2 also has, like that of example 1, a residual stress increase part T1, high stress part T2, residual stress peak part T3, and residual stress decrease part T4. As described previously, in the residual stress increase part T1, the compressive residual stress increases from the surface of the spring wire in the depth direction. In the high stress part T2, the compressive residual stress is maintained at a high level. In the residual stress peak part T3, the compressive residual stress becomes the maximum. In the residual stress decrease part T4, the compressive residual stress decreases from the residual stress peak part T3 in the depth direction of the spring wire. In the coil spring of example 2, as in the case of example 1, a part B having the compressive residual stress magnitude of which is equivalent to the magnitude of the compressive residual stress value A at the surface of the spring wire exists at a position at a depth exceeding the permissible pit depth $R_{max}$ of the spring wire. Furthermore, the coil spring of example 2 has compressive residual stress of −400 MPa or more in a wide region from the surface to a position at a depth exceeding the permissible pit depth $R_{max}$.

EXAMPLE 3

The type of steel of the spring wire is the high corrosion resistant spring steel (spring steel S) identical with example 1. The manufacturing processes are identical with example 2 except that high-frequency heating is used for heat treatment of the spring wire. In this example 3, the spring wire is heated by high-frequency heating in a quenching process S3, whereby the surface of the spring wire is prevented from being decarbonized. In a first shot peening process S6, the first shot having a shot size of 1.1 mm was used. In a second shot peening process S7, the second shot having a shot size of 0.67 mm was used. The velocity of the shot and processing temperature were identical with example 1.

Figure 7:
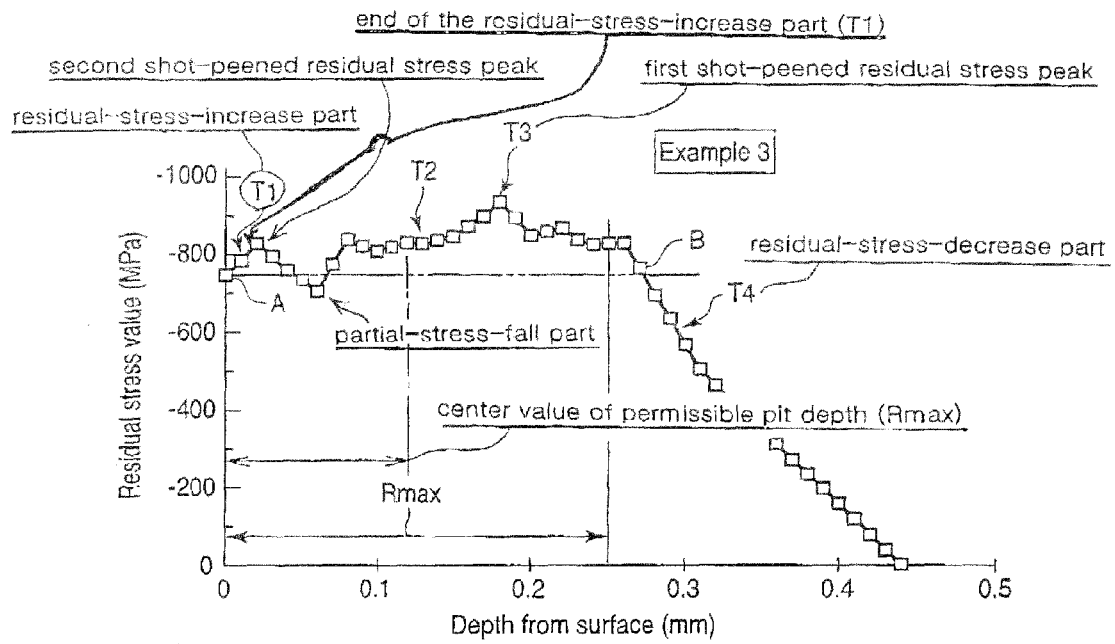
FIG. 7 is a graph showing the compressive residual stress distribution of example 3 according to the present invention.

FIG. 7 shows the compressive residual stress distribution of example 3. The coil spring of example 3 also has, like those of examples 1 and 2, a residual stress increase part T1, high stress part T2, residual stress peak part T3, and residual stress decrease part T4. Further, in the residual stress decrease part T4, a part B having the compressive residual stress magnitude of which is equivalent to the magnitude of the compressive residual stress value A at the surface of the spring wire exists at a position at a depth exceeding the permissible pit depth $R_{max}$ of the spring wire. Furthermore, the coil spring of example 3 ha-compressive residual stress of −400 MPa or more in a wide region from the surface to a position at a depth exceeding the permissible pit depth $R_{max}$.

EXAMPLE 4

The steel type of SAE 9254 was used as the spring wire. The chemical components (mass %) of SAE 9254 are C: 0.51 to 0.59, Si: 1.20 to 1.60, Mn: 0.60 to 0.80, Cr: 0.60 to 0.80, S: 0.040 max., P: 0.030 max., and Fe: remnant. The manufacturing processes are identical with example 1. In this example 4, the spring wire constituted of SAE 9254 (hardness: 53.5 HRC) was subjected to a first shot peening process (velocity: 76 m/s, processing temperature: 230° C.) by using the first shot having a shot size of 1.0 mm. Thereafter, the spring wire was subjected to a second shot peening process (velocity: 46 m/s, processing temperature: 200° C.) by using the second shot having a shot size of 0.67 mm.

EXAMPLE 5

The steel type of SAE 9254 was used as the spring wire, and a coil spring was manufactured by the same processes as example 2. That is, in example 5, the spring wire constituted of SAE 9254 (hardness: 53.5 HRC) was subjected to a first shot peening process (velocity: 76 m/s, processing temperature: 230° C.) by using the first shot having a shot size of 1.1 mm. Thereafter, the spring wire was subjected to a second shot peening process (velocity: 46 m/s, processing temperature: 200° C.) by using the second shot having a shot size of 0.67 mm.

COMPARATIVE EXAMPLE 1

As the spring wire, the high corrosion resistant spring steel (spring steel S) identical with example 1 was used. The manufacturing processes are common to example 1 except for the shot peening conditions. In comparative example 1, in a first shot peening process, the spring wire was applied with the first shot having a shot size of 0.87 mm at a velocity of 76 m/s. The processing temperature was 230° C. Thereafter, in a second shot peening process, the spring wire was applied with the second shot having a shot size of 0.67 mm at a velocity of 46 m/s. The processing temperature was 200° C.

Figure 8:
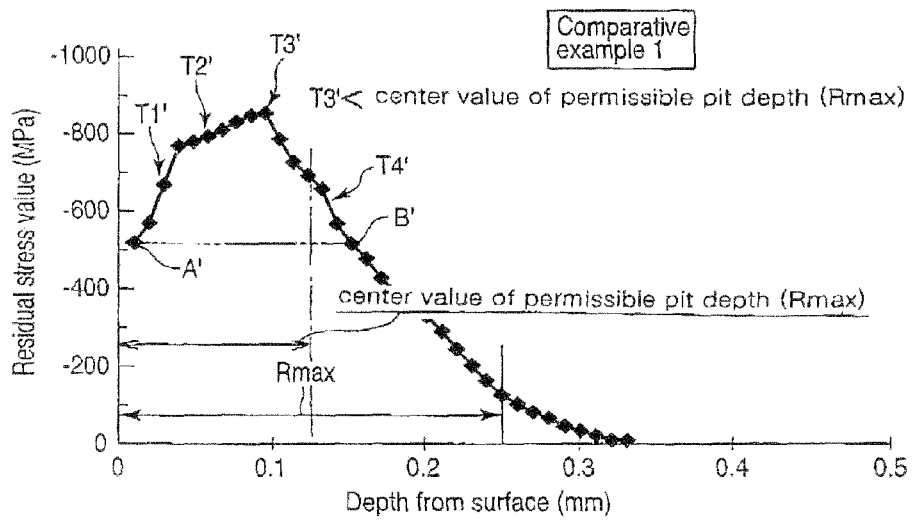
FIG. 8 is a graph showing the compressive residual stress distribution of comparative example 1.

FIG. 8 shows the compressive residual stress distribution of comparative example 1. As shown in FIG. 8, the maximum value of the compressive residual stress of comparative example 1 bears comparison with examples 1 to 3. However, in comparative example 1, a part B' at which the compressive residual stress equivalent to the compressive residual stress value A' at the surface of the spring wire exists is located at a position considerably shallower than the permissible pit depth $R_{max}$ (0.25 mm). As a result of this, there was the possibility of a fatigue crack occurring at a bottom part or the like of a corrosion pit, and the coil spring being broken when the corrosion pit grew close to the permissible pit depth (0.25 mm).

COMPARATIVE EXAMPLE 2

Comparative example 2 is identical with comparative example 1 except that SAE 9254 was employed as the steel type for the spring wire. In comparative example 2, the spring wire (hardness: 53.5 HRC) constituted of SAE 9254 was subjected to a first shot peening process (velocity: 76 m/s, processing temperature: 230° C.) by using the first shot having a shot size of 0.87 mm. Thereafter, the spring wire was subjected to a second shot peening process (velocity: 46 m/s, processing temperature: 200° C.) by using the second shot having a shot size of 0.67 mm.

[Fatigue Test Result]

Figure 9:
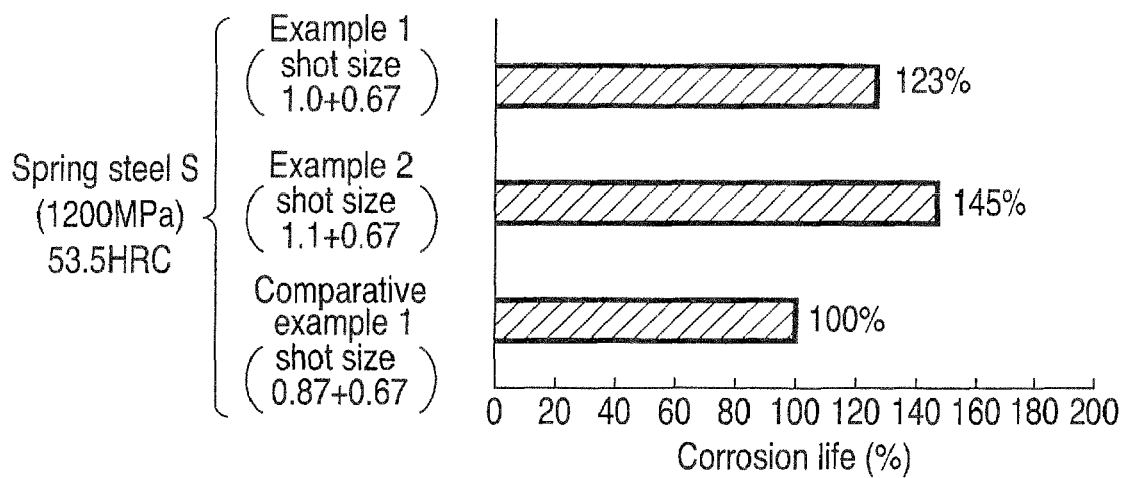
FIG. 9 is a graph showing the corrosion life of each of examples 1 and 2 according to the present invention, and comparative example 1.

FIG. 9 shows results of corrosion fatigue tests of examples 1 and 2, and comparative example 1. In the corrosion fatigue test, the coil spring was subjected to test cycles each of which is constituted of subjecting the coil spring to spraying of salt water (5% NaCl) for 30 minutes, thereafter subjecting the coil spring to vibration 3000 times, and then keeping the coil spring in an environment having humidity of 95% for 23 hours until the coil spring is broken, and the total number of vibration was measured. The test stress was 1200 MPa.

As shown in FIG. 9, in example 1, the corrosion life was markedly improved to 123% in comparison with the corrosion life (100%) of comparative example 1. Furthermore, in example 2, the corrosion life was largely improved further to 145%. As described above, in the coil springs of the above examples 1 and 2, the corrosion durability of the suspension coil springs was largely improved by the warm peening using the large-grain shot having a shot size of 1.0 mm or more.

In the conventional suspension spring, when the corrosion pit grows to approach the permissible pit depth $R_{max}$, a crack occurs earlier at a bottom part of the pit and the crack grows rapidly, thereby breaking the spring. Conversely, in the examples described above, compressive residual stress exceeding −400 MPa is imparted even to a deep position exceeding the permissible pit depth $R_{max}$. Furthermore, in the examples described above, the compressive residual stress value at a position exceeding the permissible pit depth $R_{max}$ is equivalent to or greater than the compressive residual stress value at the spring surface, and it is possible to prevent the gradient of a change in the compressive residual stress from becoming steep. As a result of this, in each of the coil springs of the examples according to the present invention, even when the corrosion pit grows to reach the permissible pit depth $R_{max}$, the compressive residual stress still remains at the depth, and hence it is possible to suppress the occurrence of a crack from the bottom part of the pit. Accordingly, even when a crack has occurred, it is possible to slow the subsequent growth of the crack, whereby it is possible to tremendously improve the corrosion durability.

Figure 10:
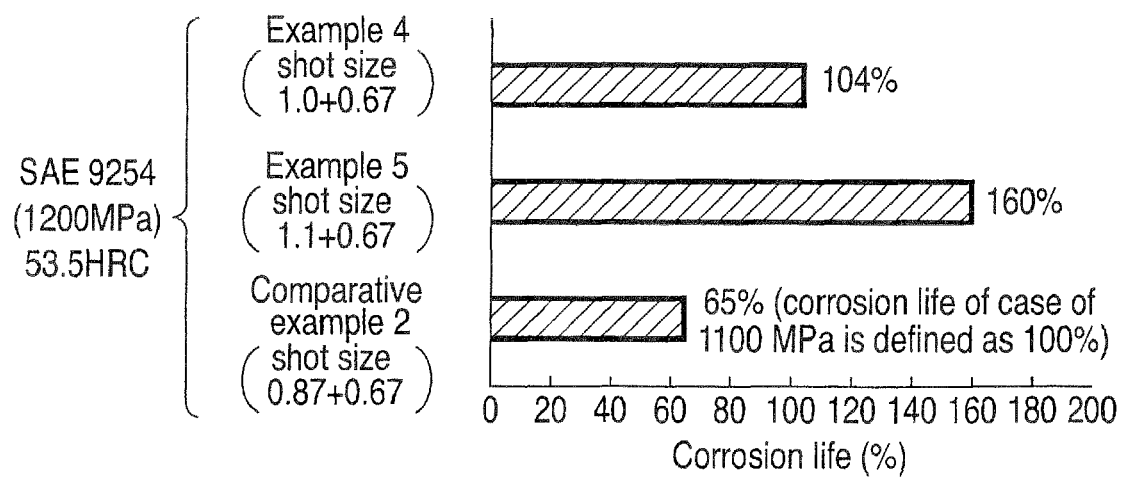
FIG. 10 is a graph showing the corrosion life of each of examples 4 and 5 according to the present invention, and comparative example 2.
Figure 11:
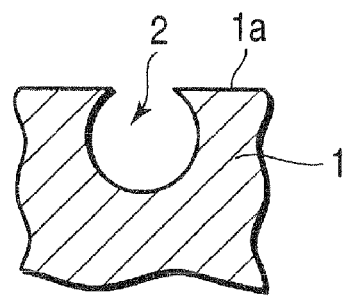
FIG. 11 is a cross-sectional view schematically showing an example of a corrosion pit.
Figure 12:
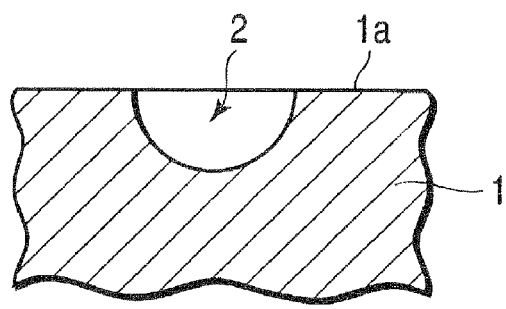
FIG. 12 is a cross-sectional view schematically showing another example of a corrosion pit.
Figure 13:
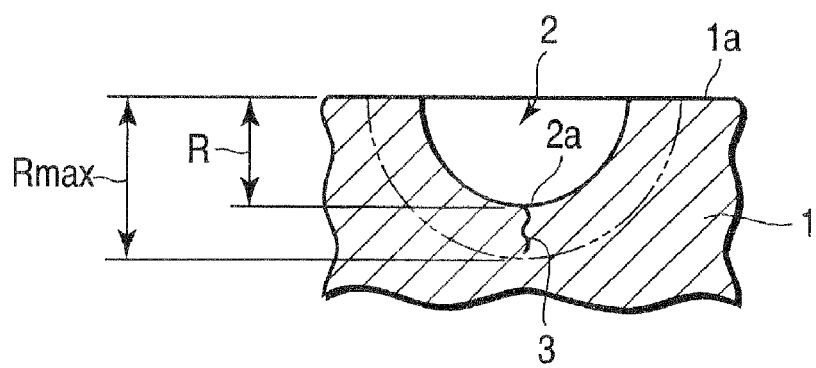
FIG. 13 is a cross-sectional view schematically showing a corrosion pit in which a crack has occurred.

FIG. 10 shows results of corrosion fatigue tests of examples 4 and 5, and comparative example 2. Here, the corrosion life of a case where the corrosion fatigue test of the coil spring of comparative example 2 is carried out at the test stress of 1100 MPa defined as 100%, and corrosion lives of cases where tests are carried out at the test stress of 1200 MPa by increasing the test stress by 100 MPa are compared with the corrosion life of above comparative example 2. When the stress was increased from 1100 to 1200 MPa, the corrosion life was lowered to 65% in comparative example 2. Conversely, in example 4, the corrosion life of 104% which was more than the conventional one was obtained. Furthermore, in example 5, the corrosion life was largely improved to 160%.

As described above, in the coil springs of examples 4 and 5, even when the employed stress was increased by 100 MPa, it was possible to make the corrosion durability equivalent to or higher than the conventional coil spring. As a result of this, it became possible to use the suspension coil spring at higher stress, and effect weight reduction. For example, in the conventional spring of the 1100 MPa class, the wire diameter was 12.1 mm, total number of turns was 5.39, and weight was 2.09 kg, whereas in the spring to be used at 1200 MPa, the wire diameter is 11.7 mm, total number of turns is 4.93, and weight is 1.79 kg, whereby weight reduction of 14.4% is achieved. In the spring to be used at 1300 MPa, the wire diameter is 11.4 mm, total number of turns is 4.61, and weight is 1.58 kg, whereby weight reduction of 23.4% is achieved.

In the compressive residual stress distribution that can be acquired by the conventional shot peening, even when it is attempted to produce compressive residual stress greater than −400 MPa up to a depth of about 0.25 mm, attenuation gradient of the compressive residual stress from the surface in the depth direction is steep, and hence the compressive residual stress at the surface must be made extremely high. As a result of this, it has been difficult to realize the above attempt due to the limit in the manufacturing method. Further, it is not impossible to produce compressive residual stress up to a deep region by using the conventional shot size and by making the velocity higher. However, in this case, in order to make the kinetic energy of the shot twice, it is necessary to increase the velocity from 78 m/s (impeller rotational speed 2300 rpm) to 109 m/s (impeller rotational speed 3279 rpm). As a result of this, problems of an increase in noise or vibration, increase in power consumption, increase in wear of the equipment, and the like are caused. Furthermore, in view of the manufacturing cost, increasing the velocity of the shot is not suitable for mass production (practical application). Further, in the conventional shot peening, the magnitude of the compressive residual stress at the bottom part of the corrosion pit is markedly and relatively lower than the magnitude of the compressive residual stress at the surface. As a result of this, even when the compressive residual stress is produced up to a position in the vicinity of the bottom part of the corrosion pit, this has little effect on preventing a crack from occurring in the vicinity of the bottom part of the corrosion pit.

Conversely, in the compressive residual stress distribution of each of the examples according to the present invention, large compressive residual stress (greater than −400 MPa) is imparted to a deep portion exceeding the bottom part of the corrosion pit. Furthermore, the compressive residual stress near the surface of the spring, and compressive residual stress near the bottom part of the corrosion pit are maintained at the same level. Moreover, the gradient of a change in the compressive residual stress is prevented from becoming steep in the region from the spring surface to the bottom part of the corrosion pit. By virtue of the above facts, even when the corrosion pit grows, it is possible to effectively prevent a crack from occurring near the bottom part of the pit or prevent the crack from growing.

Regarding the effect of each of the examples described above, the same tendency is in evidence irrespectively of the steel types, in many steel types including the above-mentioned high corrosion resistant spring steel (spring steel S), SAE 9254, and in, for example, the spring steel SUP7 conforming to Japanese Industrial Standards (JIS), the same result was obtained. Furthermore, according to the present invention, it is possible to enhance the corrosion durability by using an ordinarily used spring steel for a suspension coil spring, and hence an effect of making it possible to prevent the material cost of the coil spring from becoming high is also obtained. It is possible to apply the coil spring according to the present invention to suspension mechanisms of various vehicles including automobiles.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring for vehicle suspension made of a spring wire to which compressive residual stress is imparted by shot peening, the coil spring comprising:
    a residual stress increase part (T1) in which an absolute value of the compressive residual stress increases from a surface of the spring wire (20) in a depth direction, wherein the residual stress increase part (T1) has an end which is at a portion of the residual stress increase part (T1) that is farthest from the surface of the spring wire (20);
    a first shot-peened residual stress peak (T3) in which an absolute value of the compressive residual stress is at a maximum, and which is formed in a region of the spring wire at a depth that is greater than half of a permissible pit depth ($R_{max}$) of the spring wire (20);
    a second shot-peened residual stress peak (h) which is formed in a region of the spring wire at a depth that is less than half of the permissible pit depth ($R_{max}$), and which is provided next to said end of the residual stress increase part (T1) in the depth direction, wherein a magnitude of an absolute value of the compressive residual stress of the second shot-peened residual stress peak (h) is higher than a magnitude of an absolute value of the compressive residual stress of the residual stress increase part (T1);
    a partial stress fall part which is formed between the first shot-peened residual stress peak (T3) and the second shot-peened residual stress peak (h), wherein an absolute value of the compressive residual stress of the partial stress fall part is lower than the absolute value of the compressive residual stress of the first shot-peened residual stress peak (T3) and the absolute value of the compressive residual stress of the second shot-peened residual stress peak (h); and
    a residual stress decrease part (T4) in which an absolute value of the compressive residual stress decreases from the first shot-peened residual stress peak (T3) in the depth direction of the spring wire,
    wherein the residual stress decrease part (T4) includes a region (B) at a depth exceeding the permissible pit depth ($R_{max}$) of the spring wire (20) at which a magnitude of the compressive residual stress is equivalent to the magnitude of the compressive residual stress at the surface of the spring wire (20).

2. The coil spring for vehicle suspension according to claim 1, wherein the permissible pit depth ($R_{max}$) is 0.25 mm, and a compressive residual stress of at least −400 MPa is imparted to a region from the surface of the spring wire (20) to a position at the permissible pit depth ($R_{max}$).

3. The coil spring for vehicle suspension according to claim 2, wherein a hardness of the spring wire (20) is 50 to 56 HRC.

* * * * *